United States Patent [19]

Clark et al.

[11] Patent Number: 4,986,353
[45] Date of Patent: Jan. 22, 1991

[54] PLACEMENT PROCESS FOR OIL FIELD CHEMICALS

[75] Inventors: Charles R. Clark; Donald L. Whitfill, both of Ponca City, Okla.; D. Philip Cords, Newark, Del.; Edward F. McBride; Harold E. Bellis, both of Wilmington, Del.

[73] Assignees: Conoco Inc., Ponca City, Okla.; E. I. DuPont de Nemours and Company, Wilmington, Del.

[21] Appl. No.: 244,433

[22] Filed: Sep. 14, 1988

[51] Int. Cl.$^5$ .................... E21B 43/16; E21B 41/02; E21B 37/06

[52] U.S. Cl. .................... 166/279; 166/310; 166/902; 252/8.551; 252/8.552; 252/8.553; 252/8.555; 252/315.4

[58] Field of Search ............... 252/8.551, 8.552, 8.553, 252/8.555, 315.4; 166/279, 310, 371, 902

[56] References Cited

U.S. PATENT DOCUMENTS

| | | |
|---|---|---|
| 2,539,305 | 1/1951 | Hatch . |
| 2,676,945 | 4/1954 | Higgins ........................... 264/345 X |
| 3,072,192 | 1/1963 | Van Poolen . |
| 3,141,513 | 7/1964 | Davis . |
| 3,179,170 | 4/1965 | Burtch et al. . |
| 3,288,217 | 11/1966 | Ralston . |
| 3,574,132 | 4/1971 | Mosier et al. ................. 252/8.551 X |
| 3,666,678 | 5/1972 | Mosier et al. ................. 252/8.551 X |
| 3,770,652 | 11/1973 | Gordon . |
| 4,190,069 | 2/1980 | Krantz . |
| 4,518,509 | 5/1985 | Newberry . |
| 4,585,482 | 4/1986 | Tice et al. ......................... 106/15.05 |
| 4,611,664 | 9/1986 | Osterhoudr et al. . |
| 4,670,166 | 6/1987 | McDougall et al. ............ 252/8.552 |
| 4,715,967 | 12/1987 | Bellis et al. . |
| 4,741,401 | 5/1988 | Walles et al. ................. 252/8.551 X |

FOREIGN PATENT DOCUMENTS 696145 11/1979 U.S.S.R. .
550837 1/1943 United Kingdom .

Primary Examiner—Robert L. Stoll
Assistant Examiner—Gary L. Geist

[57] ABSTRACT

Oil field chemicals are incorporated in polymeric particles of the condensation product of hydroxyacetic acid or the co-condensation product of hydroxyacetic acid and other compounds containing hydroxy-, carboxylic acid-, or hydroxycarboxylic acid moieties. The particles are introduced into an oil well bore and/or subterranean oil formation where the polymeric particles dissolve over a period of time and release the oil field chemicals.

7 Claims, 2 Drawing Sheets

1

PLACEMENT PROCESS FOR OIL FIELD CHEMICALS

BACKGROUND AND SUMMARY OF THE INVENTION

Oil contained in the strata of subterranean formations is necessary for maintaining present domestic and industrial activities and for the advancement of science in industry generally.

An ever increasing need exists for greater supplies of oil derived from subterranean formations. Locating such oil bearing formations which are accessible and which produce a fluid in sufficient quantities to be economically operable to meet the needs for such oil is among the more important needs of the world. Also, continued production of oil from such formations for a period of time sufficient to remove a substantial portion of the oil therefrom at a minimum of operating costs and deterioration of equipment is of great importance.

Conditions which adversely affect the production of oil from a well include (1) plugging or blocking of the passageways in the formations leading to the well due to both natural and structural conditions and the deposition of plugging materials brought out during production (e.g. water blocks, emulsions of water and oil, deposition of high boiling constituents of oil and of sand and detritus generally from unconsolidated formations; (2) insufficient pressure to force the fluid through the formation to the well., and (3) corrosion of the well tubing and operating equipment in the well. Treatment of a well as by introducing an oil field chemical into the formation traversed thereby is among the more effective measures employed to increase the rate of production, prolong the producing life, and lessen the deterioration of well equipment.

In accordance with this invention these objectives are achieved by placing an oil field chemical in a solid polymeric matrix of a condensation product of hydroxyacetic acid monomer or a co-condensation product of hydroxyacetic acid and compounds containing other hydroxy-, carboxylic acid-, or hydroxycarboxylic acid moieties and thereafter introducing particles of such solid polymeric matrix into an oil well bore and/or subterranean oil formation where the oil field chemicals are released as the polymeric particles degrade in the presence of moisture to form oil and water soluble products.

DETAILED DESCRIPTION OF THE INVENTION

Figure 1:
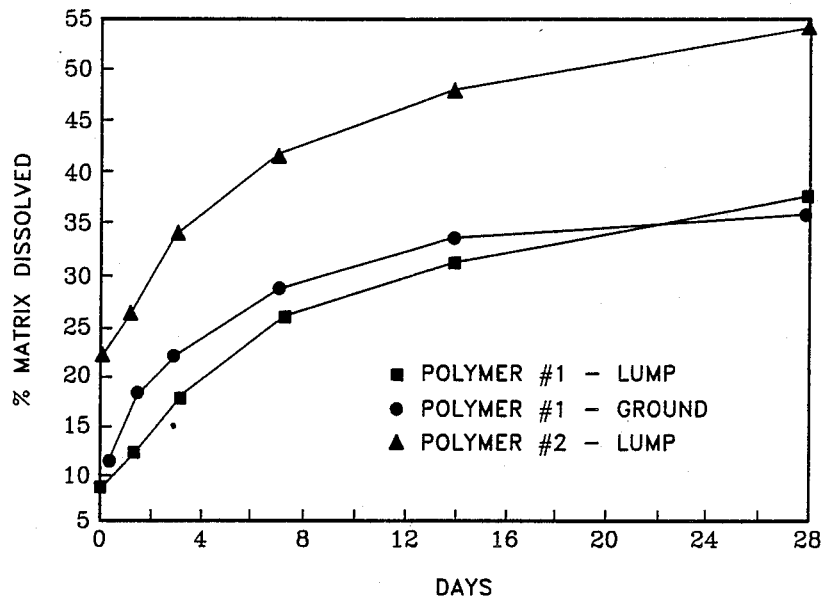
FIG. 1 is a graph showing the rate of matrix solubility at 37° C.

The polymers used in the composition and process of the present invention comprise the low molecular weight condensation product of hydroxyacetic acid with itself or with other compounds containing hydroxy-, carboxylic acid- or hydroxycarboxylic acid moieties. The condensation products are friable solids with a melting point of greater than 65° C. and generally with a degree of crystallinity. They have a number average molecular weight of 200 to 4000 or higher and preferably are oligomers having a number average molecular weight of about 200 to about 650. They are primarily trimers up through decamers. They are insoluble in both aqueous and hydrocarbon media but will degrade at specific rates in the presence of moisture and temperatures above about 50° C. to form oil and water soluble monomers and dimers. The rate of hydrolysis of the polymers at a given temperature can be increased by incorporating small amounts of other molecules (usually up to about 15% by weight) into the hydroxyacetic acid condensation reaction. These materials are usually flexible or more bulky molecules that partially disrupt crystallinity but leave the condensation product friable. Thus, the polymer can be tailored to adjust the rate of hydrolysis from a few hours to several days by controlling the amount and nature of the crystallinity.

The compounds containing the moieties with which the hydroxyacetic acid is co-condensed include but are not limited to lactic acid, tribasic acids such as citric acid, dibasic acids such as adipic acid, and diols such as ethylene glycol and polyols. They also include difunctional molecules such as 2,2-(bishydroxymethyl) propanoic acid. Co-condensing hydroxyacetic acid with different molecules produces varied physical and hydrolytic properties, thus permitting the treatment agent to be tailored to the oil well temperatures and treatment timing considerations. Preferred co-condensing molecules are lactic acid, citric acid, 2,2-(bishydroxymethyl) propanoic acid, trimethylol-ethane, and adipic acid. The most preferred are lactic acid and citric acid.

The polymer must be sufficiently hard or friable to allow it to be ground to small particle size and should have a high enough melting point to avoid softening and deforming during use and grinding. The percentages of hydroxyacetic acid and the co-condensed compounds can be controlled to achieve sufficient crystallinity and a high enough melting or softening point. The melting point should be greater than 65° C. Also, the time and temperature of condensation may be varied.

The condensation and co-condensation polymers are made by methods well known in the art. The hydroxyacetic acid may be heated alone or with the other co-condensing molecules discussed above in the presence of a catalyst such as antimony trioxide. The condensation is preferably carried out in an inert atmosphere and at 30 to 60 mm vacuum. By varying the percentages of hydroxy acetic acid and the co-condensed compounds as well as the temperatures and time of condensation, it is possible to tailor the condensation product to degrade at different rates for given wellbore temperatures. Different condensation and co-condensation products can be physically or melt blended to achieve a wider range of degradation rates.

A wide variety of oil field chemicals are contemplated for use in the composition and the process of the invention. They include such materials as corrosion inhibitors to prevent the corrosive attack of metal in oil well equipment, such as, polyamines, diamine salts, polar organic compounds and cationic surfactants; dispersants which act as solvents for paraffin, e.g. nonionic surfactants, such as TRETOLITE PD-10, PD-11 and VY-3857; pourpoint modifiers to inhibit the deposition of paraffinic material both in the channels of the formations leading to the wellbore and in the well tubing and moving parts of the equipment, usually long chain or surface active materials like TRETOLITE CF 2315 and PETROLITE PARID CF; emulsion breaking chemicals to lessen the tendency of water and oil to emulsify, such as, phenol-formaldehyde sulfonate, alkylphenol ethoxylates and polyglycols; wetting agents or surfactants to render the formation more oil wettable or more easily wettable by oil than water; and acids or acid salts such as formic acid and ammonium sulfate for the dissolution of calcium carbonate-containing formations. Also included are scale inhibitors for preventing the deposition of scale in the wellbore and formation, such as phosphonates, polyacrylates and polysulfonates; bactericides, like strong bases and aldehydes, such as glutaraldehyde and acrolein; cement additives, such as retarders and accelerators; frac fluid cross linkers, such as titanates and borates; chemical and radioactive tracers, such as various salts and radioactive salts; and asphaltene treatment chemicals, such as alkylphenol ethoxylates and aliphatic polyethers. All of the above and any other chemicals which find application in an oil well bore or an oil containing formation may also be used.

When a co-condensing compound is condensed with the hydroxyacetic acid to form the polymer matrix the amount of co-condensing compound used will vary depending on the particular compound used and the rate of hydrolysis which is desired. Usually the co-condensing compound is present in an amount up to about 15% by weight of the polymeric matrix. The amount of oil field chemical incorporated in the polymer matrix may be from as low as about 5% by weight of the polymer matrix and may constitute up to as much as about 80% by weight. The oil field chemical is easily incorporated into the polymer matrix by combining it with polymer in the molten or melted state. This may be done while the polymer is being prepared or if the polymer is already available in solid form it may be melted and the oil field chemical incorporated therein prior to resolidification of the polymer. In some instances, it may be desirable to combine the oil field chemical with the monomer or monomers during the polymerization reaction After the oil field chemical has been incorporated into the polymer matrix, the matrix is subdivided into particles by a suitable grinding procedure. For ease of handling and distribution of the polymer particles into the wellbore and the subterranean formation, it is preferable to subdivide the polymer into small particles, on the order of about one micron to about 900 microns average diameter However, larger diameter particles may be used, up to 0.3 cm or larger as desired.

The solid particulate matrix is usually introduced into the oil well bore and/or subterranean formation in a treatment fluid which may be comprised of water, oil, xylene, toluene, brines, water-in-oil emulsions or oil-in-water emulsions. The amount of oil field chemical required for a successful treatment will vary widely depending upon the particular chemical used, the size of the formation, the degree of permeability of the formation, the size of the polymer matrix particles and other variables such as wellbore fluid viscosity, etc. However, with polymer matrix particles ranging in size from about 1 micron to about 900 microns from about 0.5 to about 5 kg of chemical per 100 barrels of treatment fluid will be sufficient for most applications.

The polymeric materials to be used in the compositions and process of the invention have a number of advantages. The polymers are insoluble in both water and oil and thereby provide an advantageous base material for introducing chemicals into well bores and subterranean oil formations. In the presence of water they degrade to oil and water soluble materials which do not accumulate in the well or formation The polymeric materials are heavier than water and thus, would not be apt to be carried from the formation with produced water or oil. There is always water flow in a formation. However, often there is only a small amount of oil present. Also, the amount of water produced from a formation usually increases with the age of a well. Thus, there is always water present to degrade the polymeric particles.

The following examples illustrate the results obtained in carrying out the invention.

EXAMPLE 1

A mixture of 180 kg net of 70% hydroxyacetic acid and 18 gm of antimony trioxide was heated under nitrogen to 170° C. with removal of water, at which time 30-60 mm vacuum was applied and the temperature increased to 200° C. with continual removal of condensation water. The reaction mixture was held for about 6 hours at 200° to 220° C. and then a dispersant (nonylphenol 40EO) was combined with the molten polymer with agitation. The mixture was then discharged and allowed to cool to a crystalline solid. The composition of the solid was 85% polymer (95 kg) and 15% dispersant (17 kg). A portion of this polymer, which is designated Polymer #1, was ground to less than 60 mesh, the remainder was converted to a lump (about 0.3 cm) form.

EXAMPLE 2

A mixture of 170 kg net of 70% hydroxyacetic acid, 12 kg net of lactic acid and 18 gm of antimony trioxide was heated under nitrogen and processed (including addition of nonylphenol 40 EO) in the manner described in Example 1. The composition of the solid product was 85% polymer (96 kg) and 15% dispersant (17 kg). This polymer which is designated Polymer #2, was ground to lump (about 0.3 cm) form.

Figure 2:
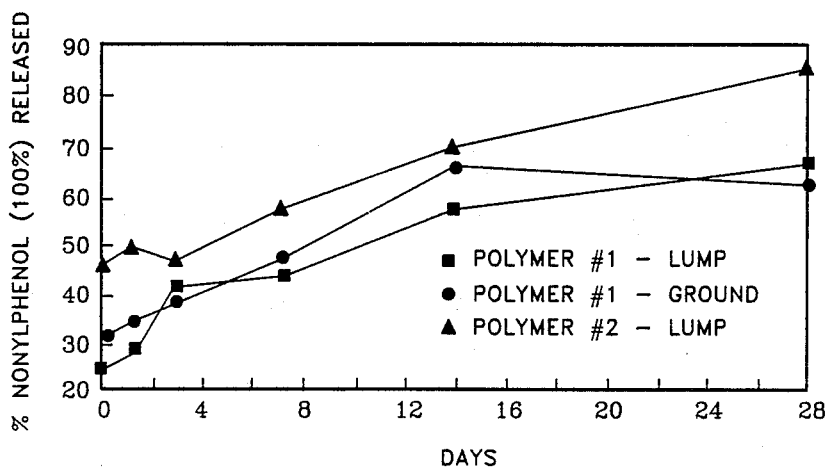
FIG. 2 is a graph showing the rate of nonylphenol release at 37° C.
Figure 3:
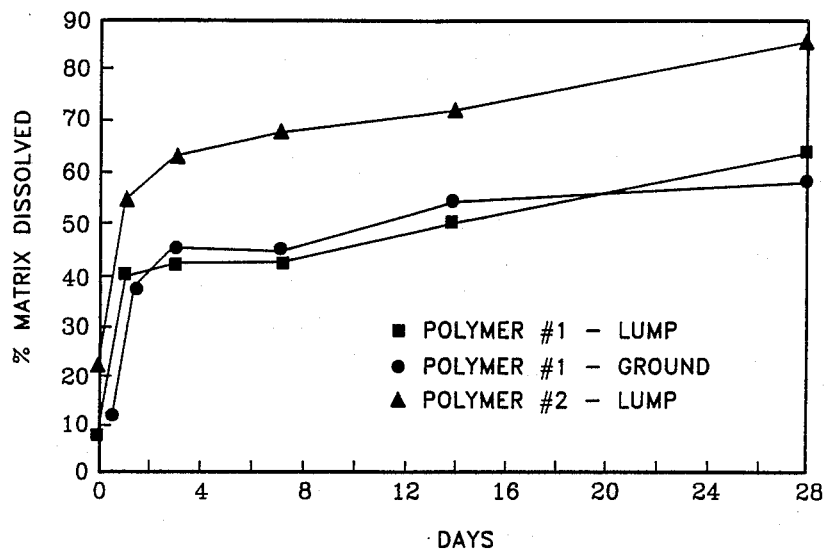
FIG. 3 is a graph showing the rate of matrix solubility at 65° C.
Figure 4:
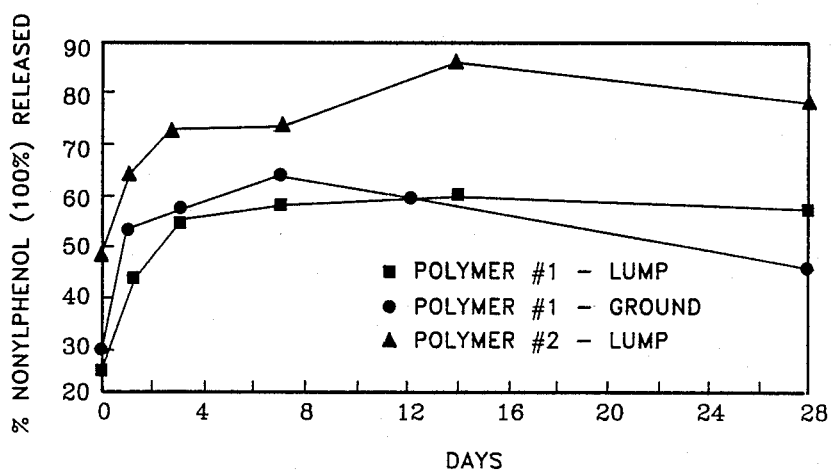
FIG. 4 is a graph showing the rate of nonylphenol release at 65° C.

One gram portions of the polymers from Examples 1 and 2 were added to 25 gm of 2% brine and allowed to stand for 28 days at 38° C. and 65° C. The % polymer matrix dissolved and the rate of nonylphenol release were measured over this time period. The results are presented in the following Table and are graphically presented in FIGS. 1, 2, 3, and 4. The "zero day" value on each graph represents 24 hours in brine at room temperature.

The graphs of matrix solubilization show fairly linear curves after the initial 1-2 days. The release of nonylphenol is about 2 times that of the total matrix.

TABLE

| Time Days | Temp. °C. | Percent Matrix Dissolved | | | Percent Nonylphenol Released | | |
|---|---|---|---|---|---|---|---|
| | | Polymer #1 Lump | Polymer #1 Ground | Polymer #2 Lump | Polymer #1 Lump | Polymer #1 Ground | Polymer #2 Lump |
| 1 | Room | 9.0 | 12.0 | 21.0 | 24.1 | 30.4 | 47.0 |
| 1 | 37 | 13.0 | 18.0 | 26.0 | 29.2 | 34.1 | 50.3 |
| 3 | 37 | 18.8 | 21.8 | 34.1 | 41.3 | 39.4 | 47.6 |

TABLE-continued

| Time Days | Temp. °C. | Percent Matrix Dissolved | | | Percent Nonylphenol Released | | |
| --- | --- | --- | --- | --- | --- | --- | --- |
| | | Polymer #1 Lump | Polymer #1 Ground | Polymer #2 Lump | Polymer #1 Lump | Polymer #1 Ground | Polymer #2 Lump |
| 7 | 37 | 25.8 | 28.7 | 42.1 | 45.2 | 47.9 | 58.3 |
| 14 | 37 | 30.8 | 33.4 | 47.6 | 59.2 | 66.6 | 69.7 |
| 28 | 37 | 37.5 | 38.1 | 54.5 | 66.8 | 65.8 | 86.2 |
| 1 | Room | 9.0 | 12.0 | 21.0 | 24.1 | 30.4 | 47.0 |
| 1 | 65 | 40.0 | 39.0 | 55.0 | 45.8 | 53.6 | 64.8 |
| 3 | 65 | 42.6 | 45.2 | 61.7 | 57.5 | 58.0 | 73.1 |
| 7 | 65 | 44.6 | 47.0 | 66.7 | 59.4 | 64.2 | 72.0 |
| 14 | 65 | 50.1 | 53.1 | 71.9 | 60.2 | 58.6 | 86.2 |
| 28 | 65 | 58.4 | 62.8 | 85.6 | 54.1 | 44.9 | 79.3 |

We claim:

1. The process for the continuous release of an oil field chemical within a subterranean hydrocarbon bearing formation or wellbore penetrating such formation comprising:
   (a) placing said oil field chemical in a solid polymeric matrix comprising the condensation product of hydroxyacetic acid monomer or hydroxyacetic acid co-condensed with up to 15 percent by weight of other hydroxy-, carboxylic acid-, or hydroxycarbonyl acid-containing moieties, said condensation product having a number average molecular weight of from about 200 to about 4000;
   (b) dispersing particles of such solid polymeric matrix containing such chemical in a wellbore fluid which is a non-solvent for such polymeric particles and contained chemical; and
   (c) introducing said wellbore fluid containing said particles into a wellbore or subterranean formation through a wellbore; then
   (d) allowing water and temperature to degrade said particulate condensation products to form water soluble and oil soluble components; and thereby
   (e) continuously releasing said chemical from said degraded particulate condensation products.

2. The process as described in claim 1 wherein the chemical in the solid particulate matrix is at least one chemical selected from the group consisting of scale inhibitors, corrosion inhibitors, surfactants, bactericides, paraffin dispersants, pourpoint modifiers, cement additives, fracture fluid cross linkers, emulsion breaking chemicals, chemical tracers, radioactive tracers, and asphaltene treatment chemicals.

3. The process as described in claim 1 wherein the chemical is placed in the solid particulate matrix by combining the chemical with condensation product in the molten state and thereafter allowing the condensation product to cyrstallize.

4. The process as described in claim 2 wherein the chemical is placed in a polymeric matrix comprising the condensation product of hydroxyacetic acid with at least one co-condensing compound selected from the group consisting of citric acid, lactic acid, trimethylolethane, 2,2-(bishydrozy-methyl) propanoic acid and adipic acid.

5. The process as described in claim 4 wherein the treatment chemical is present in the solid particulate matrix at concentrations of from about 5% to about 80% by weight of the particulate matrix.

6. The process as described in claim 5 wherein the solid particulate matrix particles range in average diameter from about 1 micron to about 900 microns.

7. The process as described in claim 1 wherein the solid particulate matrix has a number average molecular weight of from about 200 to about 650.

* * * * *